United States Patent [19]
Seborg et al.

[11] Patent Number: 5,719,788
[45] Date of Patent: Feb. 17, 1998

[54] AUTOMATIC DETECTION OF EXCESSIVELY OSCILLATORY FEEDBACK CONTROL LOOPS.

[75] Inventors: Dale E. Seborg, Santa Barbara, Calif.; Yu-Ting Tina Miao, Alameda, Ga.

[73] Assignee: The Regents of the University of California, Oakland, Calif.

[21] Appl. No.: 423,976

[22] Filed: Apr. 18, 1995

[51] Int. Cl.$^6$ .................................................. G05B 13/02
[52] U.S. Cl. ................................. 364/554; 364/148
[58] Field of Search ............................. 364/554, 148, 364/152, 138, 153, 164, 165, 154, 176, 183; 318/561, 611, 567

[56] References Cited

U.S. PATENT DOCUMENTS

| | | | |
|---|---|---|---|
| 5,257,206 | 10/1993 | Hanson | 364/502 |
| 5,365,423 | 11/1994 | Chand | 364/140 |
| 5,406,474 | 4/1995 | Hansen | 364/148 |
| 5,587,896 | 12/1996 | Hansen et al. | 364/148 |
| 5,602,761 | 2/1997 | Spoerre et al. | 364/554 |

OTHER PUBLICATIONS

Time Series Analysis and Forecasting: The Box–Jenkins Approach, O.D. Anderson, Butterworth & Co., 1976.
Time Series Analysis: Forecasting and Control, G.E. Box, G. M. Jenkins, Holden–day, 1976.

*Primary Examiner*—James P. Trammell
*Assistant Examiner*—Tony M. Cole
*Attorney, Agent, or Firm*—Daniel L. Dawes

[57] ABSTRACT

Automatic detection of excessive oscillations in feedback control loops of a completely general nature can be achieved by generating an autocorrelation function of the controlled variable or control error in the control loop. From the pattern of the autocorrelation, a decay ratio which is a function of the depth of the first minimum and height of the first maximum of the oscillation in the autocorrelation function can be generated as a measure of the oscillation in the control loop. When the decay ratio exceeds a predetermined threshold, an alarm or report can be provided indicating that an excessive oscillation has occurred and to what degree. The source of the oscillation, that is whether it is within the monitored control loop or from a source external to the control loop can then be determined and the necessary remedy applied including a step input signal to the final control element in the control loop.

5 Claims, 3 Drawing Sheets

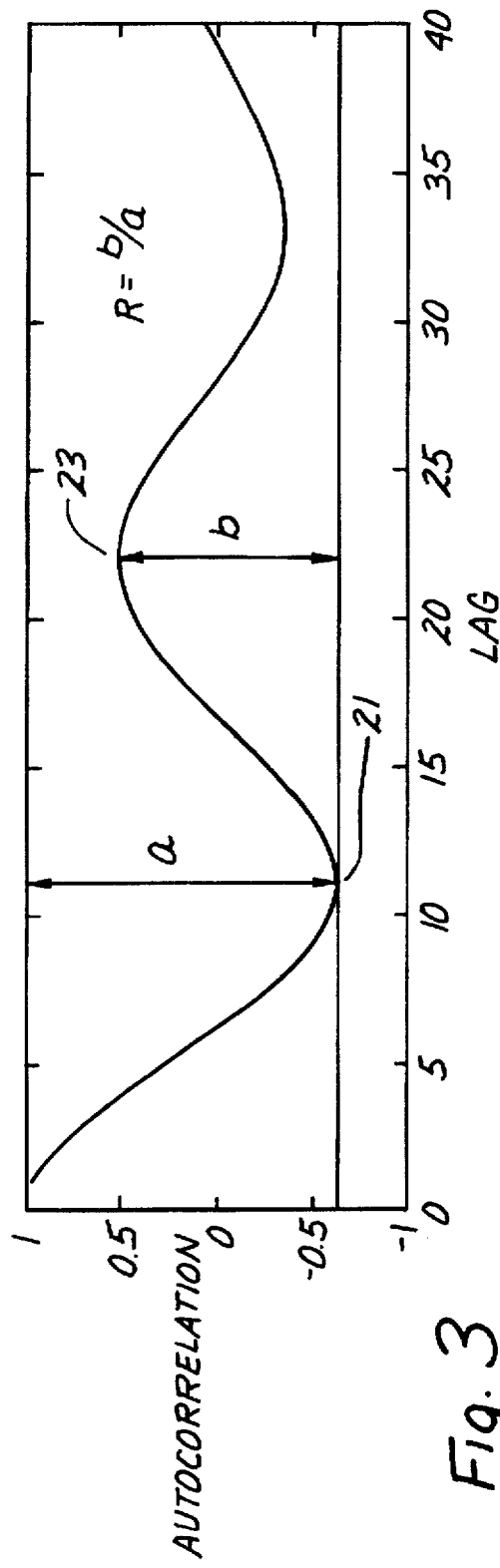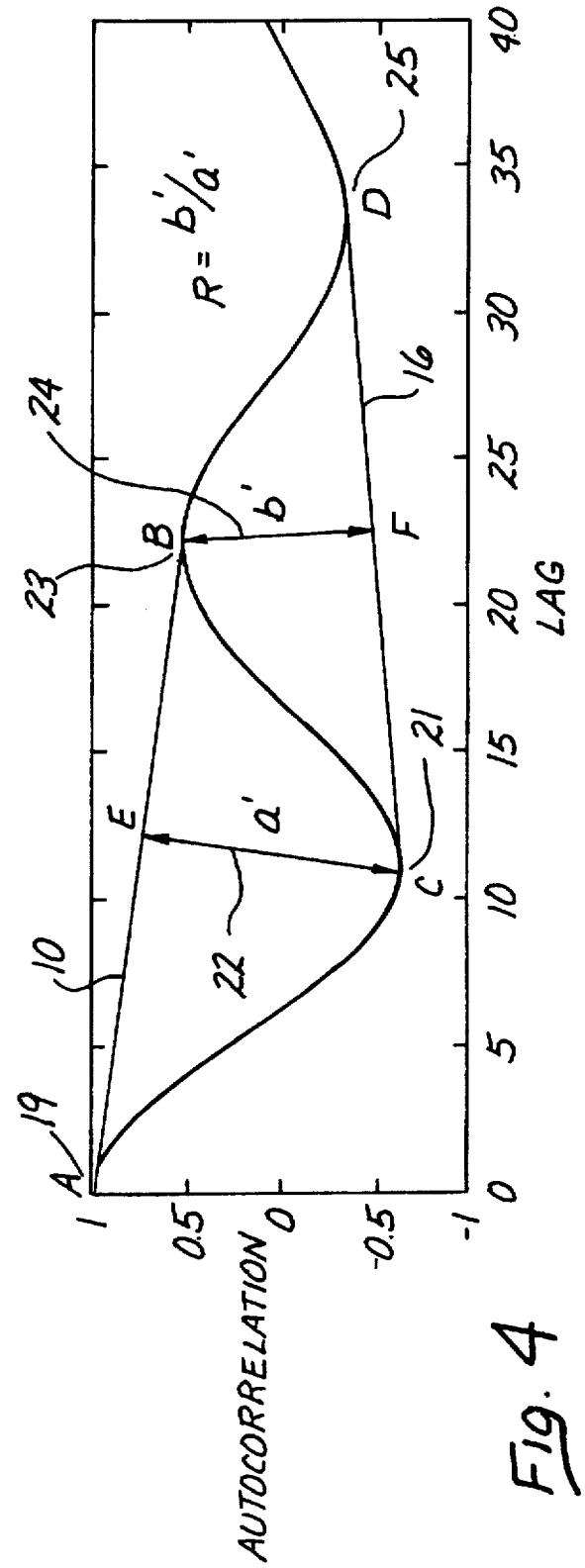

AUTOMATIC DETECTION OF EXCESSIVELY OSCILLATORY FEEDBACK CONTROL LOOPS.

BACKGROUND OF THE INVENTION

1. Field of the Invention

The invention relates to the field of automatic monitoring of control loops in a system, such as manufacturing or processing plants which may have one or more feedback control loops such that the system exhibits excessive oscillations.

2. Description of the Prior Art

Any type of system, whether it be mechanical, electrical, or complex processing system having control loops can be and often are subject to oscillations due to any one of a number of causes. For example, studies of paper mills have indicated that about 30 percent of the control loops in the mill system were oscillating because of valve problems. These oscillations were caused by high friction in the valves used in the paper mill system. Other typical examples of oscillations in control loops may be due to bad controller tuning, oscillating load disturbances, or oscillations induced by neighboring control loops.

Whatever the cause and setting of these oscillations, the oscillations caused can increase energy consumption, waste raw materials and sometimes result in less than uniform end products. Because there are several possible causes for such oscillations, it is not always easy to prevent them, and even where they are prevented, they are often cured in the wrong way. For example, oscillations caused by valve friction in systems are often sought to be remedied by detuning the controller instead of providing valve maintenance.

If a plant operator or engineer directs his attention to a particular control loop, the oscillatory response in the loop can often be detected visually from a computer monitor display or from a strip chart recording. However, and typical of large industrial processes, there are a large number of control loops and a small number of operators so that manually monitoring all the loops at all times during the operation of the process is not practical.

Very few investigators have considered the problem of diagnosis of loop control oscillation. And even where the problem has been considered, the solution has been based upon counting the number of zero crossings of the control layer signal during a specified interval of time. See, Haegglund, "Automatic Monitoring of Control Loop Performance," paper presented at the Control Systems '94 conference on Control Systems in the Pulp and Paper Industry, Stockholm, Sweden, (June 1994). The significant disadvantage of this approach is that it is unable to detect oscillatory responses when the control error is positive or negative for long periods of time, that is after a set point change or large disturbances upset the process. Others have proposed an instability indicator for expert or supervisory control systems. See Gertler and Chang, "An Instability Indicator for Expert Control," IEEE Control Systems Magazine, Vol. 6, No. 8, at 14–17 (1986). However, such prior art systems, do not detect damped oscillations because the detection scheme proposed was addressed to a different problem in which damped oscillations were not contemplated.

Therefore, what is needed is a diagnostic technique and apparatus which automatically identifies those control loops which exhibit an excessive degree of oscillation. The approach should ideally be widely applicable to any type of feedback loop and not require a process model or special input excitation. Further, after an excessive oscillation has been detected, some means must be provided for distinguishing between sources of the oscillation which are external to the control loop and oscillations which are induced by the control loop itself.

BRIEF SUMMARY OF THE INVENTION

The invention is a method for detecting excessive oscillations in a control loop by analyzing measurements of the controlled variable, y, for the control loop. A statistical measure corresponding to the data over a predetermined period of time is generated to establish a pattern of the statistical measure. A decay ratio, R, is generated as a function of the values of a first minimum and maximum of the pattern of the statistical measure. When the decay ratio, R, equals or exceeds a predetermined threshold, a signal is generated to indicate excessive oscillation of the control loop. As a result, the control loop is monitored without need for mathematically modeling operation of the control loop.

In the preferred embodiment the statistical measure is the calculated autocorrelation function for the measurement data. The decay ratio is the ratio of the height, b, of the first maximum of the pattern of the autocorrelation of the data to the depth of the first minimum, a, of the pattern of the autocorrelation of the data.

The step of generating the decay ratio, R, generates a ratio of a measure, b', of the height of the first maximum of the autocorrelation of the data to a measure relative to a line connecting adjacent minima, and a measure, a', of the depth of the first minimum of the autocorrelation of the data relative to a line connecting adjacent maxima. More particularly, the measure, b', is the perpendicular height of the first maximum above a base line connecting adjacent minimums to the first maximum. The measure, a', is the perpendicular depth of the first minimum with respect to a base line connecting adjacent maximums to the first minimum.

The steps of generating the data, statistical measure, decay ratio and determining when the decay ratios equals or exceeds the predetermined threshold are repeated for a plurality of control loops in the system.

The method further comprises the step of disabling operation of the control loop for a short period of time and repeating the steps of generating the data, statistical measure, decay ratio and determining when the decay ratio equals or exceeds the threshold to determine if oscillation of the controlled variable, y, exists in manual operation without feedback control and thereby indicates that oscillations were induced by the feedback control loop itself or were due to an external source.

Where the control loop includes a final control element, the method further comprises the step of changing the command signal to the final control element while the control loop is disabled to determine if excessive oscillation is caused by the final control element.

In the illustrated embodiment the step of generating the statistical measure generates sample autocorrelations of a manipulated input of the control loop, u.

In one embodiment the step of generating the statistical measure generates sample autocorrelations of a controller output signal of the control loop.

In another embodiment the step of generating the statistical measure generates a cross correlation function of two process variables, u and y, and the spectrum of the autocorrelations of y. The spectrum of the autocorrelations in the control loop may be selected from input (u) signals. Alternatively, the spectrum of the autocorrelations in the control loop may be selected from controller output signals.

Still further the step of generating data generates data corresponding to a control error signal, $e=y_{sp}-y$, where y is a controlled variable and $y_{sp}$ is a set point for the feedback control loop for the controlled variable.

The invention is also characterized as an apparatus for diagnosing excessive oscillations in a control loop comprising a circuit or device for obtaining data relating to the control loop. Another circuit generates a statistical measure of the obtained data. The same or another circuit generates a decay ratio, R, of the statistical measure indicative of a pattern in the data. A control circuit determines whether the decay ratio equals or exceeds a predetermined threshold. As a result, excessive oscillations in the data are detected. Each of these circuits may be separate discrete logic circuits or software controlled portions of a computer.

The invention may be better visualized by turning to the following drawings wherein like elements are referenced by like numerals.

BRIEF DESCRIPTION OF THE DRAWINGS

FIG. 3 is a graph of autocorrelation verses time lag for a system in which the decay ratio, R, is calculated using a first method.

FIG. 4 is a graph of autocorrelation verses time lag for a system in which the decay ratio, R, is calculated using a second method.

The invention and its various embodiments may now be better understood by considering the following detailed description.

DETAILED DESCRIPTION OF THE PREFERRED EMBODIMENTS

Automatic detection of excessive oscillations in feedback control loops of a completely general nature can be achieved by generating an autocorrelation function of the controlled variable or control error in the control loop. From the pattern of the autocorrelation, a decay ratio which is a function of the depth of the first minimum and height of the first maximum of the oscillation in the autocorrelation function can be generated as a measure of the oscillation in the control loop. When the decay ratio exceeds a predetermined threshold, an alarm or report can be provided indicating that an excessive oscillation has occurred and to what degree. The source of the oscillation, that is whether it is within the monitored control loop or from a source external to the control loop can then be determined and the necessary remedy applied including responsive control of the final control element in the control loop.

A statistical analysis of measurement of a controlled variable is used to determine whether the feedback control loop exhibits excessive oscillations. The diagnostic analysis is based on the decay ratio of the sample autocorrelations of the controlled variable and/or the control error, where the control error equals the difference between the set point and the controlled variable.

Because normal operating data is used, no special experimental test or unusual actions by plant personnel are required. Further, no particular or special mathematical model of the process being monitored is needed. The method of the invention is applicable to any type of feedback control loop.

More specifically, the pattern of the sample autocorrelation function for either the controlled variable, y, or the control error, e, where $e=y_{sp}-y$ and $y_{sp}$ is the setpoint basis of the invention. Autocorrelation is a statistical measure of the self-relationship of a series of sequential values one to another, usually time measurements of a signal, and sample autocorrelation is estimated for the kth lag as:

$$r_k = c_k/c_0$$

where $$c_k = 1/N \sum_{i=1}^{N-k} (z_i - \bar{z})(z_{i+k} - \bar{z}) \text{ for } k = 0, 1, 2, \ldots K$$

and z is the sample mean of the time series, and N the number of sample points in the series.

Figure 1:
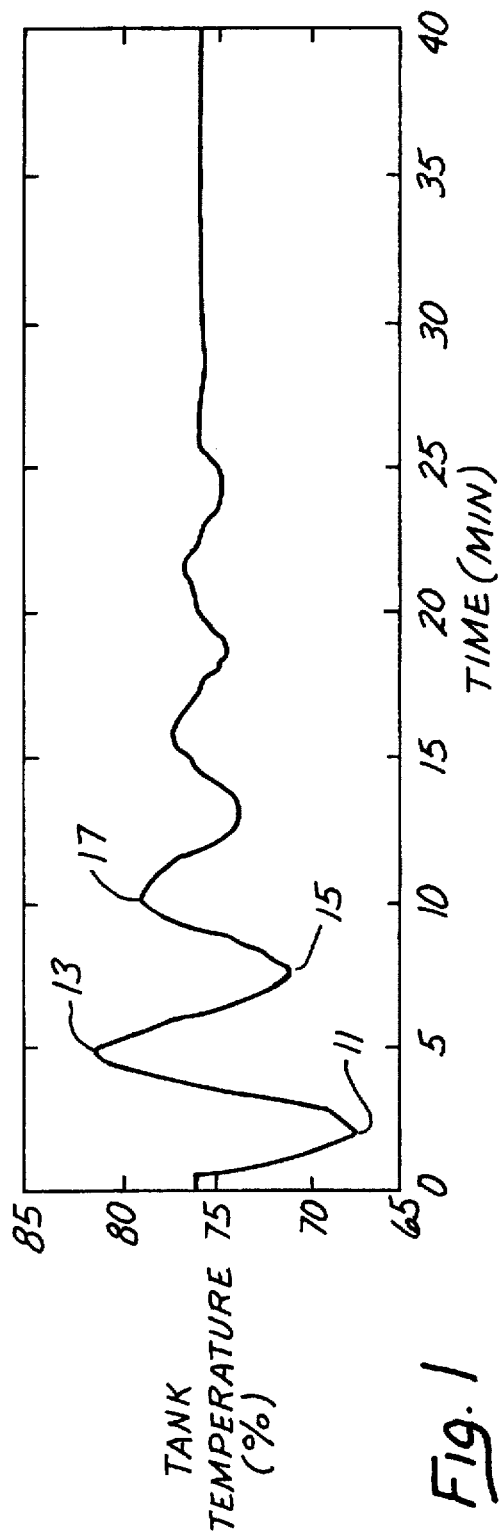
FIG. 1 is a graph of the oscillations in tank temperature verses time in a simple control loop system.
Figure 2:
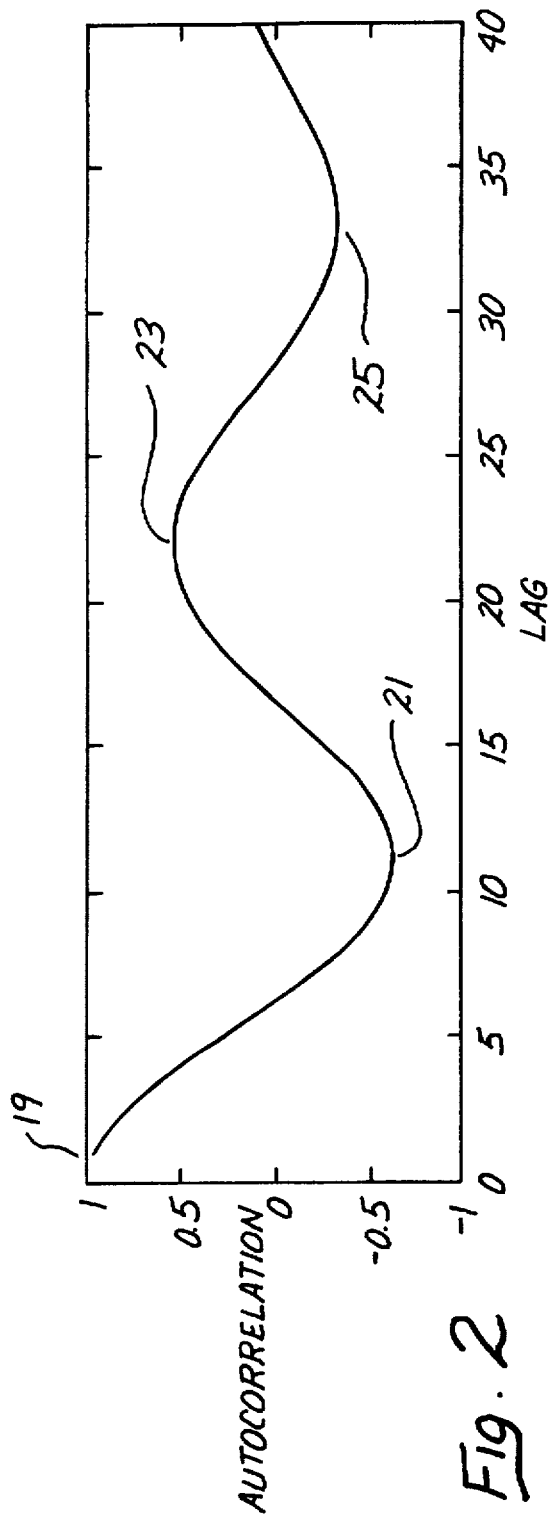
FIG. 2 is a graph of the autocorrelation verses the time lag for the system of FIG. 1.

In the illustrated embodiment, a laboratory stirred-tank heating process subject to a control loop is illustrated in connection with FIG. 1. Figure I is a graph of the tank temperature as a function of time showing temperature oscillations as a controller attempts to regulate the tank temperature. A time sequential series of minimums 11 and 15 and intervening maximums 13 and 17 typical of excessively oscillating systems are depicted. The sample autocorrelation function as a function of lag of the data shown in FIG. 1 is illustrated in FIG. 2. The sample autocorrelation function also oscillates at a slower and smoother trace showing maximums 19 and 23 and minimums 21 and 25. In real world systems measurement errors and noise is often so high that obtaining accurate characterization of the data using the directly measured variable often makes detection of oscillatory behavior impractical or at the very least, unreliable. It has been determined according to the invention that the autocorrelation function is a much more useful and reliable measure from which to detect oscillatory signals.

The degree of control loop oscillation, R, is defined as a ratio as shown in FIGS. 3 and 4 of the height of the first sequential oscillations, b, to depth, a. In a first embodiment, the ratio, R, is calculated as the decay ratio, b/a, where a and b are distances determined from the total depth of first minimum 21 and the total height of first maximum 23 of the sample autocorrelation function as depicted in FIG. 3. A second embodiment of the invention is illustrated in FIG. 4, where the calculation of R is modified to take into account any long-term trend which may exist in the sample autocorrelations. In the second embodiment, a straight line 10 is drawn from maximum 19 which is 1.0 at the zero lag value, and the next succeeding first maximum 23, which in the illustration of FIG. 4 is at about the lag value of 23. Straight line 16 is also drawn to connect the first two minima at points 21 and 25. Line 22 is then drawn from minimum 21 perpendicular to line 10, and line 24 is drawn from maximum 23 perpendicular to line 16. The calculated value of R is then taken as the ratio of the length of line 24 to line 22, b'/a'.

In both embodiments of the method as described in FIGS. 3 and 4, a value of R above a predetermined threshold value indicates that the control loop is excessively oscillatory. The threshold value is a design parameter, which in the illustrated method, is 0.5 as a default value. The value will be subject to design choice in any given application according to the teachings of the invention. Although the foregoing description has been described in the two embodiments of FIGS. 3 and 4 as a graphic method, in practice, R is calculated directly from the sample autocorrelation data, and no graphical representation is necessary.

Figure 5:
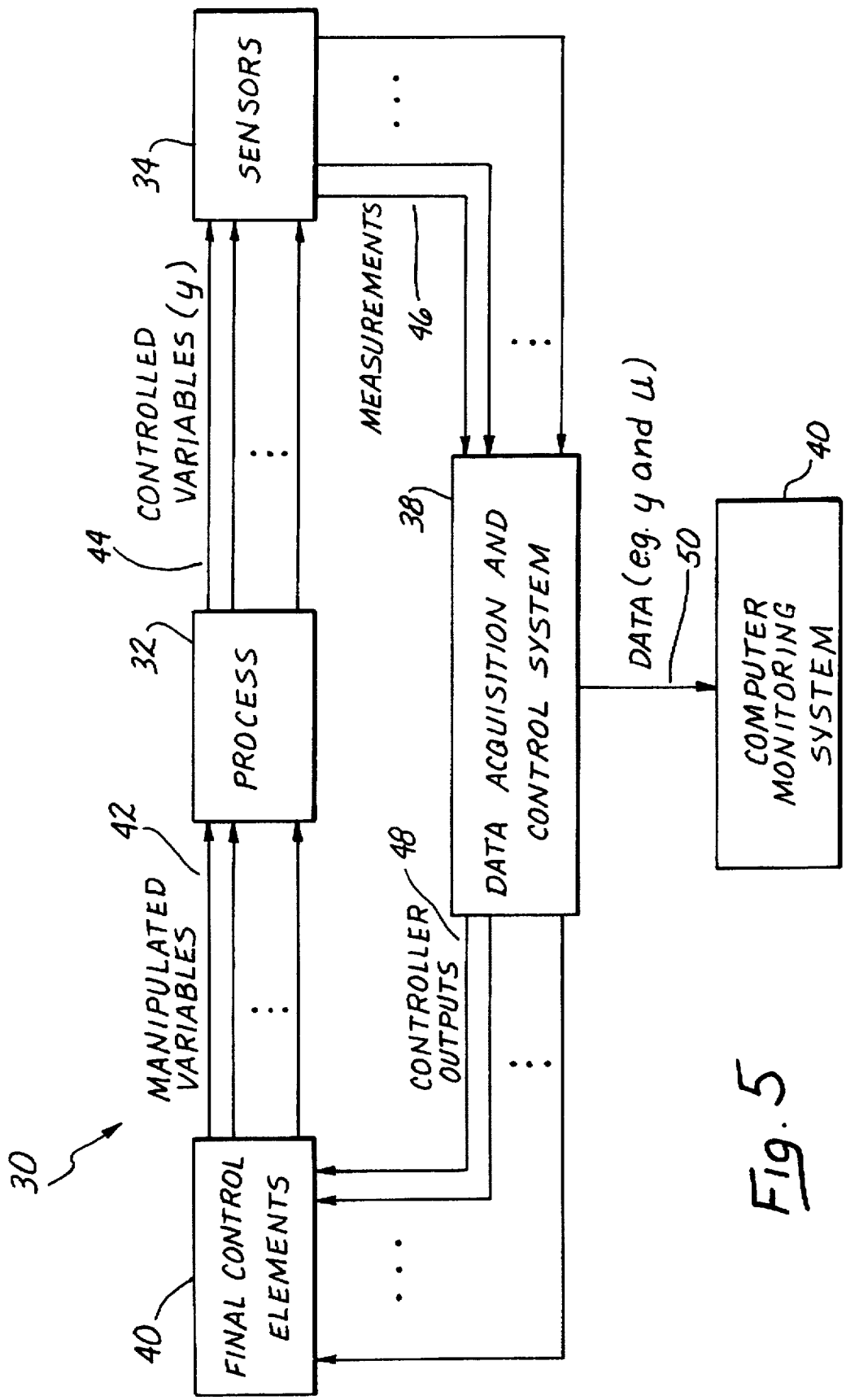
FIG. 5 is a simplified block diagram of an idealized, abstract system in which multiple control loops are monitored and controlled according to the invention.

FIG. 5 is a simplified block diagram of one embodiment of an apparatus, generally denoted by reference numeral 30 in which the method described above may be practiced. A system, or a process such as an industrial process, is symbolically denoted by the block labeled 32. One or more controlled variables 44 are measured using sensors 34. The measurements 46 are transmitted to a data acquisition and control system 36 which performs the control calculations for one or more control loops and then sends one or more controller output signals 48 to the final control elements 40 which are often control valves. The final control elements then adjust the manipulated variables 42 in an attempt to keep the controlled variables at their desired values, i.e. set points. A diagnostic computer system 38 receives data 50 from data acquisition and control system 36 and performs the statistical analysis to determine whether any of the control loops exhibits an excessive oscillation. In particular, the diagnostic computer system 38 calculates the autocorrelation function and the value of the performance index, R. For example, the controlled variable temperature may be affected by the mount of steam inserted into a stem jacket which in tufa is controlled by data acquisition and control system 38 through an output control signal or signals to one or more stem and recirculation valves. A computer monitoring system 40 bidirectionally communicates with controller 38 or directly with any one of the control loops to monitor system 30 as described above. The basic output of computer 40 is the decay ratio, R.

The diagnostic methods of FIGS. 3 and 4 have been evaluated using a wide variety of simulated and experimental data, including actual industrial data. The applications have demonstrated that the proposed methods are both practical and widely applicable. By monitoring the value of R through computer control for each control loop within a complex industrial process, the existence of excessive oscillations can be automatically detected. It should be apparent based on the foregoing description that the monitoring method has the advantage that no special experimental test is required. Only the actual operating data for a relatively short time period during the dosed-loop operation of any control loop in the process is needed. Data collected during unusual conditions, such as set point changes or large disturbances, can be analyzed as well as data for normal operating conditions.

Only a modest amount of plant data and information is required in order to utilize the methodology of the invention. In particular, measurements of the controlled variable, y, which is temperature in the example of FIGS. 1 and 2, over a relatively short period of time, is required, such as over the open-loop response time of the process in question, which in the illustrated embodiment was about 35 minutes. The only additional information is the knowledge of the set point of the control loop during the same time period and other standard information concerning the control loop, such as controller settings, sampling period, and filter content, if analog or digital filtering of output data is employed.

No action is required by plant operating personnel in order to implement the method. Instead, the results of the diagnostic analysis are reported to personnel on an advisory basis. For example, summary of the control loops in a process which exhibit excessive oscillation can be issued in the form of a short report, either on a CRT screen or printout.

The diagnostic technique is easily implemented on digital computers that are readily available in industrial plants and commercial buildings. The autocorrelation calculations typically take less than two minutes on a workstation, and can easily be performed by a personal computer. As a consequence, hundreds or even thousands of feedback control loops can be simultaneously monitored in a specific sequence, in a random sequence, or upon selective operator demand. Further, the monitoring of the control loops does not have to be done at real time because the data analysis can be performed using logged or historical data.

The diagnostic technique of the invention is widely applicable. The method can be used to analyze control loop responses of processes which exhibit nonlinear behavior. No understanding or mathematical model of the processes is required for the detection method to be successful or reliable. The feedback controller does not have to be a proportional-integral-derivative (PID) type controller.

By contrast, many currently available diagnostic techniques for feedback control systems require that a dynamic model of the monitored process be available or based on the assumption that the process behaves in a linear manner. These assumptions are not valid in many industrial control problems and accurate dynamic models are often not available.

Many extensions of the method of the invention are possible. For example, the sample autocorrelations of the manipulated input, the control error signal ($y_{sp}-y$), and the controller output signal, cross correlations of the signals with the controlled variable, y, and the spectra of these signals can all be used to provide useful information. See Box and Jenkins, "*Time Series Analysis: Forecasting and Control,*" Holden-Day, San Francisco (1976).

The diagnosis of the control loop performance can be easily increased in scope. If the control loop exhibits excessive oscillations, additional diagnostic tests can then be employed to determine whether the oscillations are caused by the feedback control loop itself, or by external sources or disturbances. For example, if the feedback controller is placed in the manual mode for a short period of time and the oscillation or damped oscillations cease, then it is likely the oscillations were induced by the feedback control loop itself.

However, if the oscillations persist, then they are probably due to an external source, such as another process unit or other control loops. The oscillations in a control loop may be due to a final control element, such as a control valve, damper, or variable speed pump, which is malfunctioning. The situation can be clarified by placing the controller in manual control and making a small step change in the controller output signal to the final control element.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for detecting oscillations in a control loop comprising:

generating data of a controlled variable, y, for said control loop;

generating an autocorrelation function corresponding to said data over a predetermined period of time to establish a pattern;

generating a decay ratio, R, as a function of the values of a first minimum, a', representing depth measured relative to a line connecting adjacent maxima and a first maximum, b', of said autocorrelation function measured relative to a line connecting adjacent minima; and determining when said decay ratio, R, equals or exceeds a predetermined threshold to indicate excessive oscillation of said control loop, whereby said control loop is monitored without need for mathematically modeling operation of said control loop.

2. The method of claim 1, wherein generating said decay ratio, R, generates a signal having a magnitude equal to the measure, b', of the height of said first maximum by producing a signal proportional to the perpendicular height of said first maximum above a base line connecting adjacent minima to said first maximum, and where generating said measure, a', generates a signal proportional to the perpendicular depth of said first minimum to a base line connecting adjacent maxima to said first maximum.

3. A method for detecting oscillations in a control loop comprising:

generating data of a controlled variable, y, for said control loop;

generating a statistical measure corresponding to said data over a predetermined period of time to establish a pattern of said statistical measure;

generating a decay ratio, R, as a function of the values of a first minimum and maximum of said pattern of said statistical measure;

determining when said decay ratio, R, equals or exceeds a predetermined threshold to indicate excessive oscillation of said control loop, whereby said control loop is monitored without need for mathematically modeling operation of said control loop; and disabling operation of said control loop and repeating said steps of generating said data, statistical measure, decay ratio, and determining when said decay ratio equals or exceeds said threshold to determine if oscillation of said controlled variable, y, exists in manual operation without feedback control thereby indicating that oscillations were induced by said feedback control loop itself or were due to an external source.

4. The method of claim 3 where said control loop includes a final control element and further comprising changing a command signal sent to said final control element while said control loop is disabled to determine if excessive oscillation is caused by said final control element.

5. A method for detecting oscillations in a control loop comprising:

generating data of a controlled variable, y, for said control loop;

generating sample autocorrelations of a controller output signal;

generating a decay ratio, R as a function of the values of a first minimum and maximum of said sample autocorrelations; and determining when said decay ratio, R, equals or exceeds a predetermined threshold to indicate excessive oscillation of said control loop, whereby said control loop is monitored without need for mathematically modeling operation of said control loop.

* * * * *